United States Patent [19]

Jones

[11] Patent Number: 5,175,237
[45] Date of Patent: Dec. 29, 1992

[54] PREPARATION OF POLYESTER COPOLYMERS

[75] Inventor: Edward B. Jones, Hendersonville, Tenn.

[73] Assignee: E. I. Du Pont de Nemours and Company, Wilmington, Del.

[21] Appl. No.: 649,352

[22] Filed: Feb. 1, 1991

[51] Int. Cl.⁵ ..................... C08G 63/127; C08G 63/88
[52] U.S. Cl. ................................. 528/300; 528/302; 528/308; 528/308.6
[58] Field of Search ............ 528/300, 302, 308, 308.6; 525/437, 444

[56] References Cited

U.S. PATENT DOCUMENTS 4,001,187 1/1977 Itabushi et al. ..................... 528/274

*Primary Examiner*—Nathan M. Nutter
*Assistant Examiner*—Jeffrey Culpeper Mullis
*Attorney, Agent, or Firm*—Earl L. Handley

[57] ABSTRACT

Preparation of polyester resins from dimethylterephthalate by forming bis(2-hydroxyethyl) terephthalate, and using a portion of this product as solvent for one or more dicarboxylic acids and one or more dihydric alcohols, reacting the acids and alcohols, and combining the portions, and polymerizing the mixture.

3 Claims, 1 Drawing Sheet

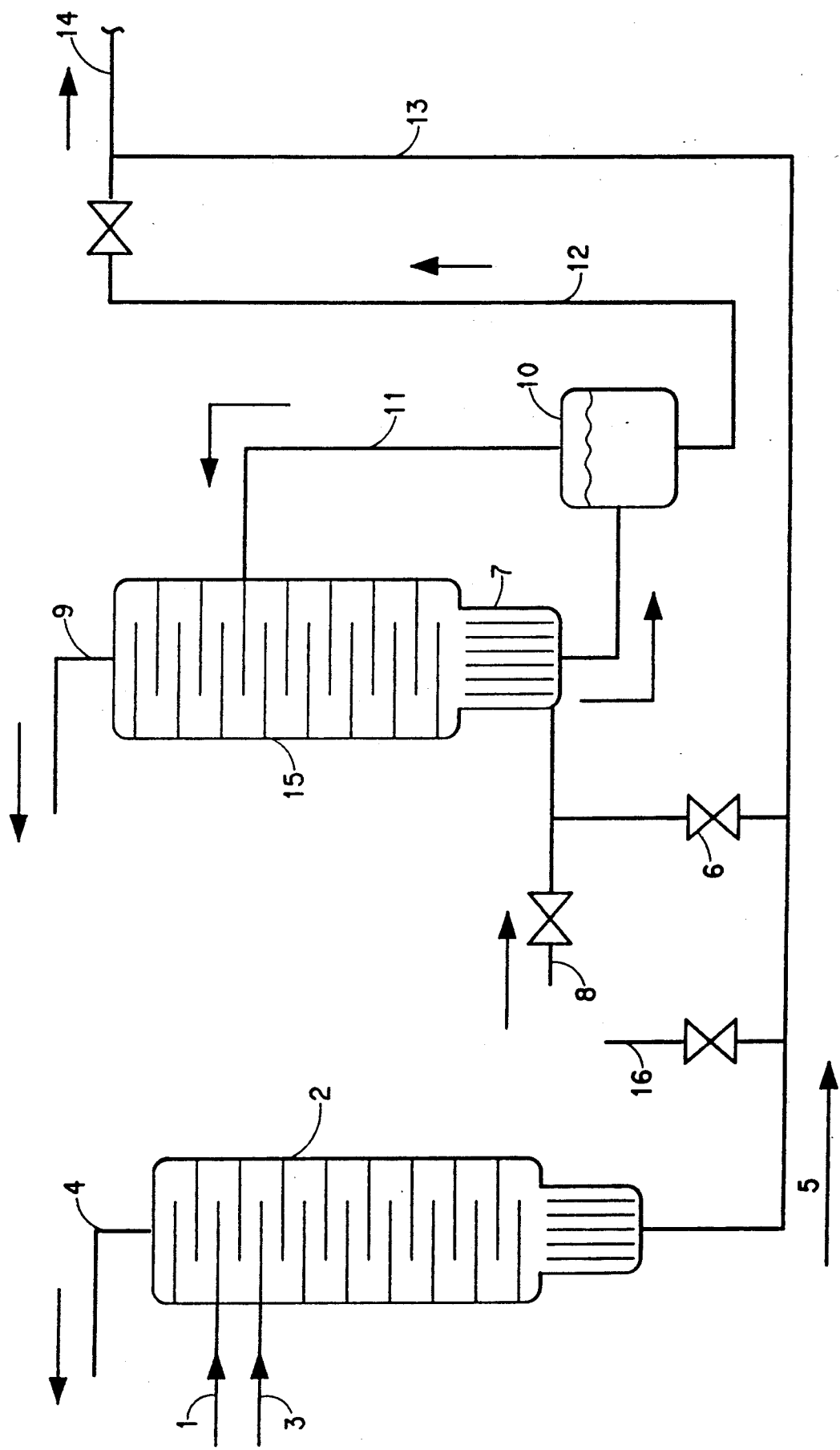

PREPARATION OF POLYESTER COPOLYMERS

FIELD OF THE INVENTION

This invention relates to a continuous process for the preparation of polyester polymers containing polymerized units from dimethylterephthalate and dicarboxylic acids.

BACKGROUND OF THE INVENTION

Many commercial polyesters are copolymers containing polymerized terephthalic acid units and polymerized other dicarboxylic acid units, such as isophthalic acid units, along with polymerized dihydric alcohol units such as ethylene glycol units. The other dicarboxylic acid units modify the polymer properties in desirable ways, for example, by improving the clarity of molded articles, and by lowering the melting point of fibers made from such copolymers, thus making such fibers useful as binder fibers in polyester webs.

For example, commercial processes for the manufacture of such copolymers utilize mixtures of terephthalic acid and isophthalic acid, or mixtures of dimethylterephthalate and dimethylisophthalate. Dimethylisophthalate is commercially available, but is considerably more expensive than isophthalic acid. In commercial facilities that utilize dimethylterephthalate it is economically desirable to employ isophthalic acid as the source of the isophthalic units; however, as pointed out in British Patent 1,073,640 to Goodyear, "If isophthalic acid is substituted for the dimethylisophthalate . . . the ester interchange reaction between dimethylterephthalate and glycol is inhibited. . . " It is believed that the isophthalic acid causes the ester interchange catalyst, often a manganese catalyst, to become inactive and perhaps precipitate. This British patent found a solution to this problem by first reacting isophthalic acid and the glycol, then carrying out the ester interchange reaction of dimethylterephthalate and glycol in the presence of the bis-glycol isophthalate, and finally condensing the mixture to form the polyester copolymer.

It has now been discovered that the desired copolymers can be produced in a continuous process by first ester interchanging dimethylterephthalate and ethylene glycol to form a stream of bis(2-hydroxyethyl) terephthalate (sometimes called BHET), separating a portion of the stream, and into the separated portion adding one or more dicarboxylic acids and one or more dihydric alcohols, reacting these added compounds to form bis esters and water, removing the water, then combining the separated stream with the stream from which it was originally separated and finally polycondensing the bis compounds to form polyester.

It has been found that the just described process gives an advantage in that the "side stream" reaction allows for easy removal of water, and does not burden the downstream polycondenser with having to remove both water and glycol. Furthermore, the rate of reaction of the added dicarboxylic acid with the added dihydric alcohol is increased, especially in cases where the solubility of the acid in the dihydric alcohol is low.

SUMMARY OF THE INVENTION

The present invention is a continuous process for the preparation of high molecular weight polyester resin which comprises forming a stream containing bis(2-hydroxyethyl) terephthalate by the ester interchange reaction of dimethylterephthalate with ethylene glycol, separating a portion of the stream, into the separated portion adding one or more dicarboxylic acids and one or more dihydric alcohols, and reacting said acid(s) and said alcohol(s) in the separated portion to form bis ester(s) and water, removing the water, and then combining the separated portion now containing the newly formed bis ester(s) with the stream from which it was separated, and then polycondensing the bis compounds in the stream to form high molecular weight polyester.

The process is satisfactory to make polyesters having polymerized units derived directly from the acid in the amount of 1 to at least 50% of the acid units in the copolymer. Usually the amount of polymerized units derived directly from the acid will be in the range of 1% to 25%, and preferably in the range of about 3% to about 20%.

The mole ratio of dihydric alcohol to dicarboxylic acid added to the side stream should be at least about 1:1 and may be considerably higher, for example 5:1, but because the excess alcohol will be recovered from the reaction mixture it is usually not desirable to operate at a ratio much above 3:1. A ratio of about 2 to 1 is preferred, The separated portion of the stream containing bis(2-hydroxyethyl) terephthalate into which the dicarboxylic acid(s) and the dihydric alcohols are added and reacted should be large enough to dissolve the added amount of acid(s) and alcohol(s), but should preferably not be present in a great excess over this amount. If the volume of the separated portion greatly exceeds the amount necessary to dissolve the added amount of added components then larger reactors are required to provide sufficient hold up time to complete the reaction.

The dicarboxylic acid may be a mononuclear aromatic acid such as isophthalic acid or terephthalic acid, a polynuclear aromatic acid such as 2,6-naphthalene dicarboxylic acid or an aliphatic acid such as azelaic acid.

The dihydric alcohol can, for example, be ethylene glycol, 1,4-butane diol, or an alicyclic diol such as 1,4-di(hydroxymethyl) cyclohexane or a dihydric alcohol containing an ether linkage such as diethylene glycol.

DESCRIPTION OF THE DRAWING

The drawing is a simplified schematic flow diagram of the process for producing the desired polyester polymer containing polymerized dicarboxylic acid units.

EXAMPLE 1

A solution of 5360 grams of manganese acetate hexahydrate catalyst was made up in 6410 lbs of virgin ethylene glycol plus 5250 lbs of ethylene glycol recycled from the continuous polymerization unit (typically this recycle contains ~650 ppm antimony). This mixture, 1, in the drawing, was then pumped into an ester exchange reactor, 2, at a rate of 2065 lbs/hour along with 2766 lbs/hour of dimethylterephthalate, 3. This reactor, 2, comprised a 22 plate column with a Dowtherm heated calandria. The ingredients were pumped in close to the top of the column and allowed to percolate down to the calandria. Column temperatures ranged from 65 deg C. at the top of the column where the released methanol 4 exited to ~200 deg C. on the first plate. The calandria was maintained at a temperature of 240 deg C.

A 1% slurry, 16, of antimony oxide (catalyst) in ethylene glycol was then added to the resulting bis(2-hydroxy ethyl) terephthalate (BHET), 5, at a 165 lbs/hour rate. The monomer was then pumped through filters (not shown) to a diverter valve 6 where 250 lbs/hour was taken off as a side stream to the isophthalic acid reactor.

The side stream BHET monomer was injected into the base of the reactor calandria 7 along with a slurry of isophthalic acid in ethylene glycol 8. This slurry was made up at a 2/1 mole ratio of ethylene glycol to isophthalic acid and 7 pumped into this reactor at a rate equivalent to that of the BHET monomer (250 lbs/hour). The 7 reaction temperature was maintained at 240 deg C. The water, 9, liberated during this reaction was evaporated in the column 15 and thus removed. The mixed BHET/ bis(2-hydroxy ethyl)isophthalate (BHEI) monomer was then pumped to a secondary reactor, 10, where the reaction between the isophthalic acid and the ethylene glycol was completed. Water, 11, released in the secondary reactor was vented to column, 15, above the reactor 7. The mixed BHET/BHEI monomer stream, 12, was then filtered and combined with the major BHET monomer flow stream, 13, to form stream 14 just prior to feeding the mixture to polymerization vessels not shown.

Polymerization was then carried out through a series of heated vacuum vessels where the pressure was progressively reduced to ~2 mm Hg and the temperature increased to 290 deg C.

EXAMPLE 2

A slurry of 59.1 grams of terephthalic acid in ethylene glycol (44.1 grams) was added to bis(2-hydroxyethyl)-terephthalate (171.9 grams) prepared in a manner similar to that described in example 1 and the mixture heated for 3½ hours. After this time, a near theoretical amount of water distilled overhead. The bis glycol ester was then polymerized to polyester in a manner similar to that previously described. In a companion experiment, the absence of the bis(2-hydroxyethyl) terephthalate, the amount of BHET formed was insignificant, as measured by the amount of water formed.

I claim:

1. A continuous process for the preparation of high molecular weight polyester resin which comprises forming a stream containing bis(2-hydroxyethyl) terephthalate by the ester interchange reaction of dimethylterephthalate with ethylene glycol, separating a portion of the stream, into the separated portion adding isophthalic acid and ethylene glycol in about a 2/1 mole ratio of ethylene glycol to isophthalic acid and reacting said isophthalic acid and said ethylene glycol in the separated portion to form the corresponding bis ester and water, removing the water, and them combining the separated portion now containing the newly formed bis ester with the stream from which it was separated, and then polycondensing the bis compounds in the stream to form high molecular weight polyester.

2. The process of claim 1 in which the amount of isophthalic acid added to the separated portion is sufficient to produce when combined with the stream from which it was separated a polyester in which the acid units are 1 to 25% isophthalic acid units.

3. The process of claim 1 in which the volume of the separated portion is sufficient to dissolve the added isophthalic acid and ethylene glycol.

* * * * *